(12) United States Patent
Huang (10) Patent No.: US 9,710,679 B2
(45) Date of Patent: Jul. 18, 2017

(54) ANTI-DATA THEFT STRUCTURES AND ELECTRONIC DEVICES WITH THE SAME

(71) Applicant: HON HAI PRECISION INDUSTRY CO., LTD., New Taipei (TW)

(72) Inventor: Ying-Jui Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 11 days.

(21) Appl. No.: 14/826,029

(22) Filed: Aug. 13, 2015

(65) Prior Publication Data
US 2016/0055356 A1  Feb. 25, 2016

(30) Foreign Application Priority Data

Aug. 22, 2014  (TW) .............................. 103129029 A (51) Int. Cl.
*G06F 21/88* (2013.01)
*H05K 5/02* (2006.01)
*G06F 21/86* (2013.01)
*H01R 12/71* (2011.01)
*H01R 13/639* (2006.01)
*H01R 12/70* (2011.01)
*H01R 13/24* (2006.01)
(Continued)

(52) U.S. Cl.
CPC .............. *G06F 21/88* (2013.01); *G06F 21/86*
(2013.01); *H01R 12/714* (2013.01); ***H01R
13/6397* (2013.01); *H05K 5/0208*** (2013.01);
*H01R 12/7076* (2013.01); *H01R 13/2478*
(2013.01); *H01R 29/00* (2013.01); *H01R 31/08*
(2013.01)

(58) Field of Classification Search
CPC ......... G06F 21/86; G06F 21/88; G06F 13/409
See application file for complete search history.

(56) References Cited

U.S. PATENT DOCUMENTS

2007/0037454 A1\* 2/2007 Bushby .............. H01R 13/6397
439/680
2007/0186923 A1\* 8/2007 Poutiatine ............. A61J 7/0038
128/200.14
(Continued)

FOREIGN PATENT DOCUMENTS

CN           2879350 Y     3/2007
CN        101266510 A     9/2008
(Continued)

*Primary Examiner* — Dao Ho
(74) *Attorney, Agent, or Firm* — Steven Reiss (57) ABSTRACT

An anti-data theft structure in an electronic device includes a second cover, a printed circuit board (PCB), a connector, a plurality of terminals, and an elastic element. The PCB includes a first press piece. The connector is rotatably coupled to the second cover and defines a plurality of slots facing PCB. A number of terminals are received in the slots according to a predetermined order. The elastic element is located between the connector and the second cover. When the first press piece resists against connector, the terminals are electrically coupled to the PCB to allow normal working. When the first press piece is separated from the connector, the connector is rotated away under the elastic force to cause the terminals to fall from the slots. Reassembly of the connector contacts so as not to be in the predetermined order causes lockdown and lockout of the electronic device.

12 Claims, 6 Drawing Sheets

(51) Int. Cl.
    *H01R 29/00*     (2006.01)
    *H01R 31/08*     (2006.01)

(56) References Cited

U.S. PATENT DOCUMENTS

| | | | |
|---|---|---|---|
| 2008/0100457 A1* | 5/2008 | Gray | E05B 45/005 340/572.9 |
| 2012/0055209 A1 | 3/2012 | Conti et al. | |
| 2012/0186086 A1* | 7/2012 | Tavares De Pinho | E05G 1/024 29/897.34 |
| 2012/0227447 A1* | 9/2012 | Conti | E05B 45/005 70/15 |
| 2013/0160149 A1 | 6/2013 | Zhang et al. | |

FOREIGN PATENT DOCUMENTS

| | | |
|---|---|---|
| CN | 201114234 Y | 9/2008 |
| CN | 101495080 A | 7/2009 |
| CN | 201581697 U | 9/2010 |
| CN | 101944244 A | 1/2011 |
| CN | 202197458 U | 4/2012 |
| TW | 201009636 A | 3/2010 |
| TW | I361364 | 4/2012 |

\* cited by examiner

ANTI-DATA THEFT STRUCTURES AND ELECTRONIC DEVICES WITH THE SAME

FIELD

The subject matter herein generally relates electronic device security.

BACKGROUND

Electronic devices often store classified technical information. When the electronic device is sold or stolen, disassembly of the electronic device can be done by an unauthorized person. The unauthorized person can falsify the system and even steal the technical information.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to anti-data theft structures and electronic device with the same.

Figure 1:
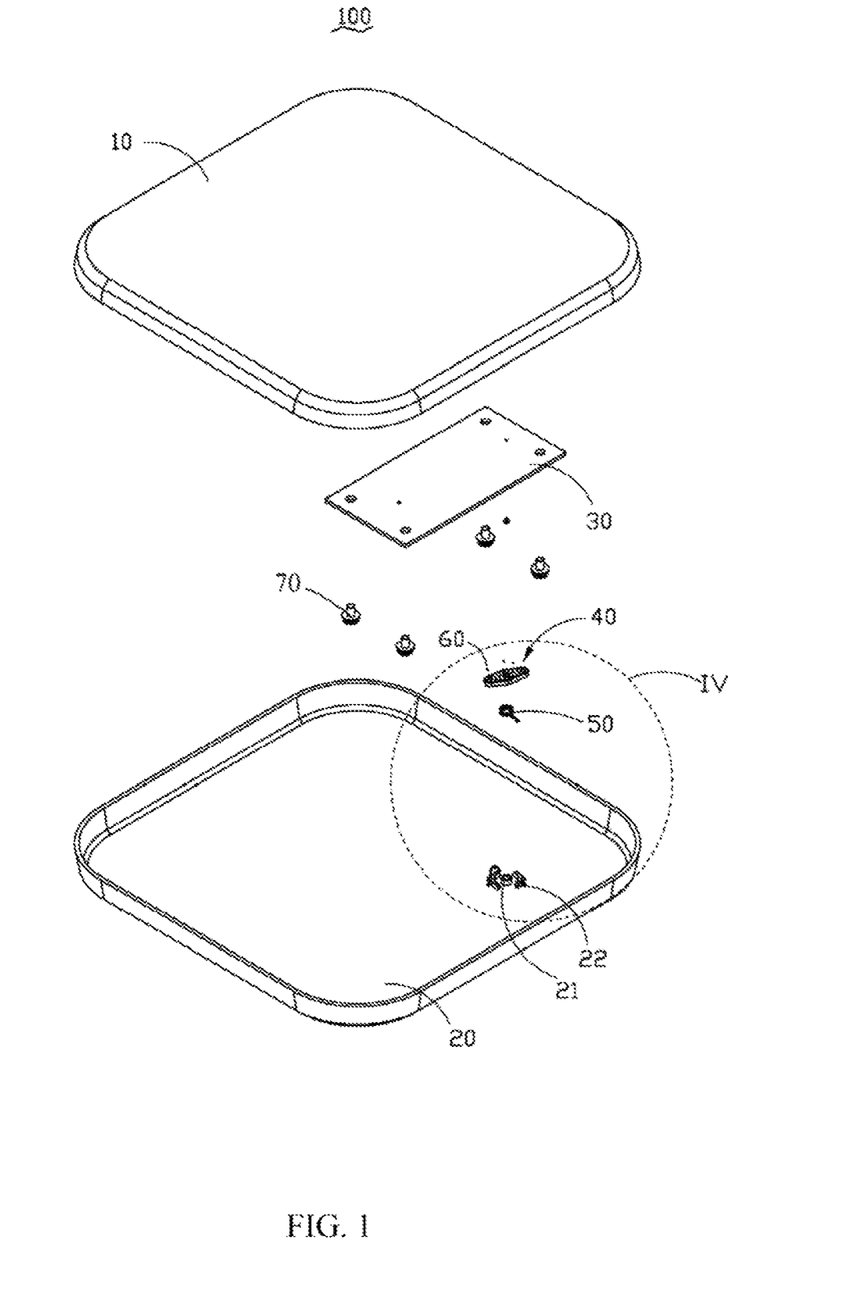
FIG. 1 is an exploded view of an electronic device with anti-data theft structure.

FIG. 1 illustrates that an electronic device 100 includes a first cover 10, a second cover 20 opposite to the first cover 10, a printed circuit board (PCB) 30, and a connector 40. The electronic device 100 has the capability to prevent unauthorized persons resetting the system of the electronic device 10 or stealing data after disassembling the electronic device 100. The first cover 10 is detachably coupled to the second cover 20 and forms a receiving chamber with the second cover 20. The PCB 30 is received in the receiving chamber and located on an inner surface of the first cover 10. The connector 40 is rotatably coupled to the second cover 20. An elastic element 50 is located between the connector 40 and the second cover 20. When the first cover 10 is assembled to the second cover 20, the PCB 30 resists against connector 40 to rotate the connector 40 with respect to the second cover 20, and to rotatably compress the elastic element 50. When the first cover 10 and the second cover 20 are disassembled, the PCB 30 is separated from the connector 40, and the connector 40 will rotate to its original position under the elastic force. In the exemplary embodiment, the elastic element 50 is a torsion spring.

Figure 2:
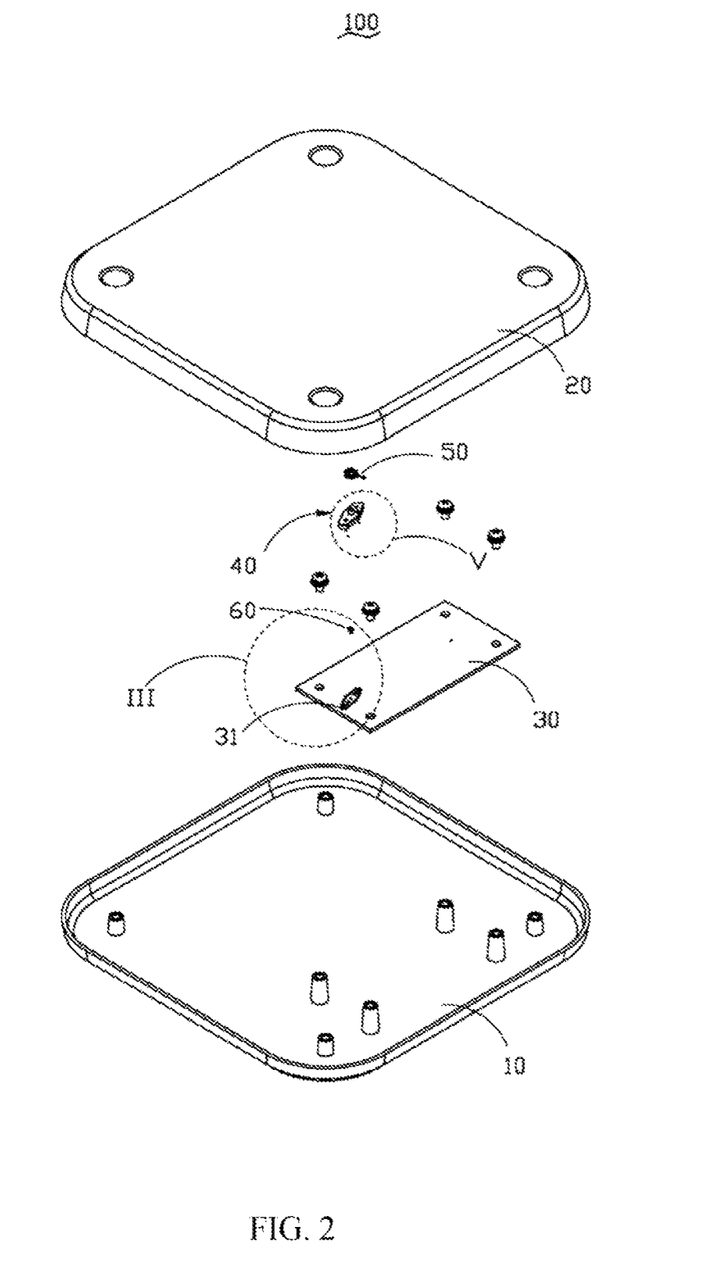
FIG. 2 is an exploded view of the electronic device of FIG. 1 viewed from another angle.
Figure 3:
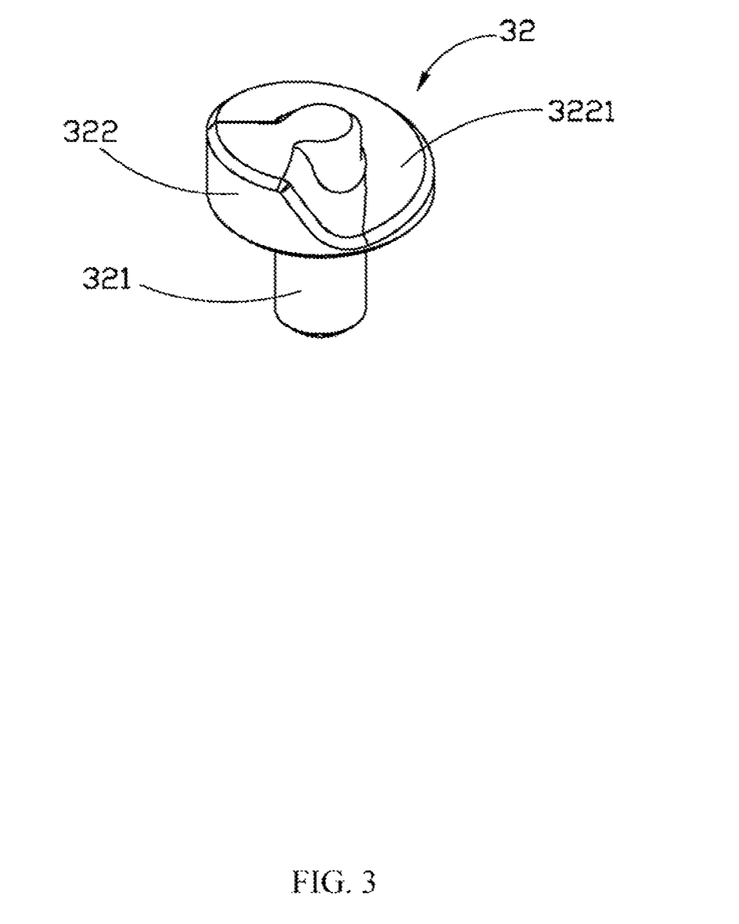
FIG. 3 is an enlarged view of circle IV of FIG. 1.

FIGS. 2-3 illustrate that the PCB 30 is mounted on the first cover 10 by screws 70. A plurality of pads 31 and a first press piece 32 are located on a surface of the PCB 30 corresponding to the connector 40. The plurality of pads 31 are electrically coupled to the connector 40. The first press piece 32 resists against connector 40 to rotate the connector 40 with respect to the second cover 20. The first press piece 32 includes a connecting post 321 and a flange 322 defined on the connecting post 321. The connecting post 321 perpendicularly extends from the PCB 30 to the connector 40. The flange 322 includes a first matching surface 3221 corresponding to the connector 40. In the exemplary embodiment, the first matching surface 3221 is a spiral shape and the connecting post 321 is the center of the spiral. The first matching surface 3221 is a first spiral face spiraling in a first direction, which is formed by the flange 32 and the connector 40, centered on the connecting post 321. A helix of the first spiral face spirals away from the connector 40.

Figure 4:
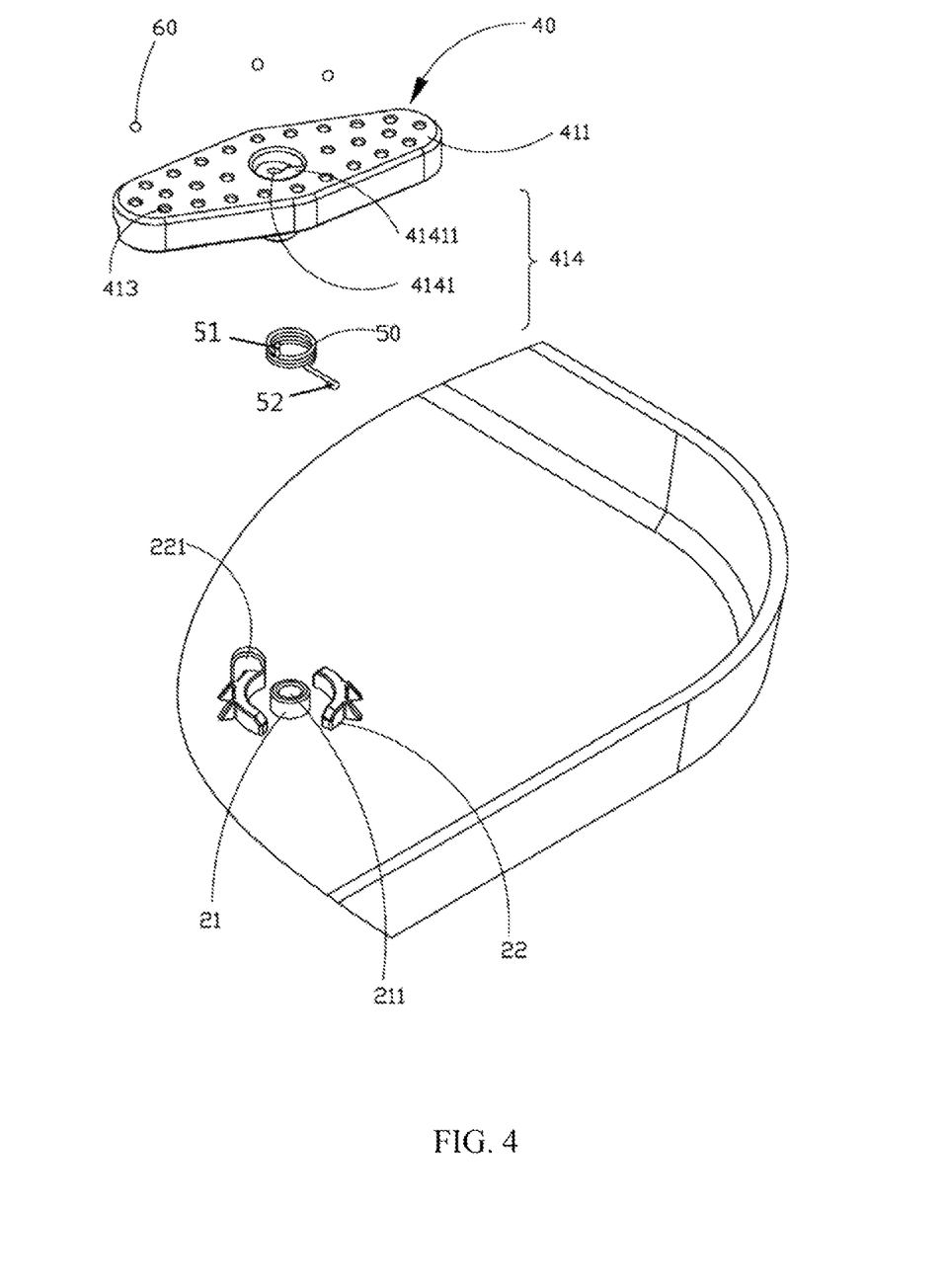
FIG. 4 is an enlarged view of circle III of FIG. 2.
Figure 5:
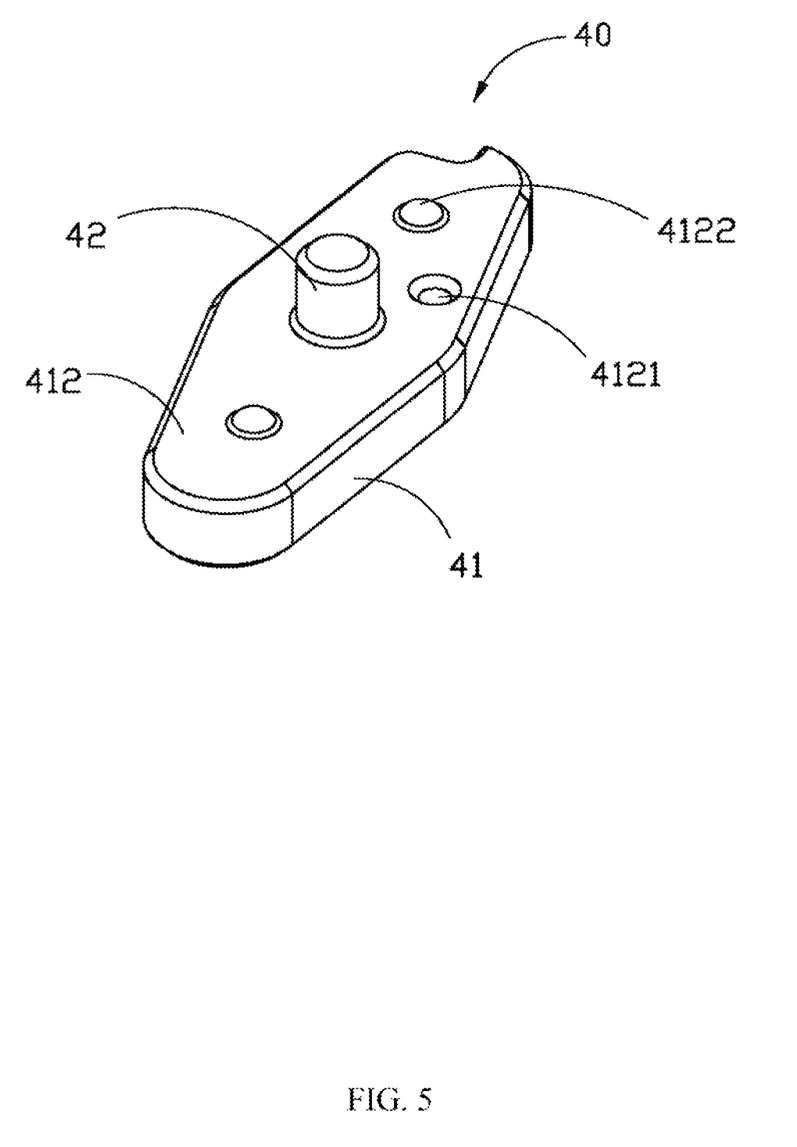
FIG. 5 is an enlarged view of circle V of FIG. 2.

FIGS. 4-5 illustrate that the connector 40 can be electrically coupled to the PCB 30 and the combination enables control signals to make the electronic device 100 work. The connector 40 includes a main body 41 and a shaft 42 extending from a center of the main body 41. The main body 41 includes a first surface 411 and a second surface 412 opposite to the first surface 411. The first surface 411 faces the PCB 30, and the second surface 412 faces the second cover 20. The shaft 42 is located on the second surface 412 of the main body 41.

A plurality of slots 413 and a second press piece 414 are defined on the first surface 411. The plurality of slots 413 has a one-to-one correspondence with the plurality of pads 31. Each of the slots 413 is a spherical recess. A plurality of terminals 60 are located in the plurality of slots 413. In the exemplary embodiment, at least one slot 413 is set to receive at least of the terminals 60, the number of terminals 60 being less than the number of slots 413. The terminals 60 are metal balls and partially received in their slots 413. When the main body 41 is shaken, the terminals 60 fall out from the slots 413. The second press piece 414 corresponds to the first press piece 32. A center line of the second press piece 414 is same as center line of the shaft 42, which is perpendicular to the main body 41. The second press piece 414 engages with the first press piece 32 to rotate the connector 40 with respect to the second cover 20. The second press piece 414 defines a hole 4141 extending from the second surface 412 to the first surface 411. A second matching surface 41411 is formed on the outer surface of the hole 4141. The second matching surface 41411 is a spiral shape, the hole 4141 being the center of the spiral. The second matching surface 41411 forms a second spiral face in a second direction opposite to the first direction, the hole 4141 being the center of the second spiral. A helix of the second spiral face spirals away from the PCB 30. When the first matching surface 3221 engages with the second matching surface 41411, the main body 41 is rotated around the shaft 42 by the engagement of the first matching surface 3221 and the second matching surface 41411. The second surface 412 defines a recess 4121 and a pair of projecting portions 4122. The two projecting portions 4122 are symmetrical to the center line of the shaft 42. The elastic element 50 comprises a first end 51 and a second end 52 opposite to the first end 51.

The second cover 20 includes a base 21 and two symmetrical supporting portions 22 surrounding the base 21. The base 21 is located in a middle position between the two supporting portions 22. The base 21 is a pillar and defines an axle hole 211. The shaft 42 is received in the axle hole 211. The supporting portions 22 support the main body 41, and the two projecting portions 4122 respectively contact the second surfaces of the supporting portions 22. The two projecting portions 4122 reduce a frictional force generated by a rotation of the main body 41 relative to the supporting portion 22. One of the supporting portions 22 includes a stopper 221 to stop excessive rotation by the main body 41.

Figure 6:
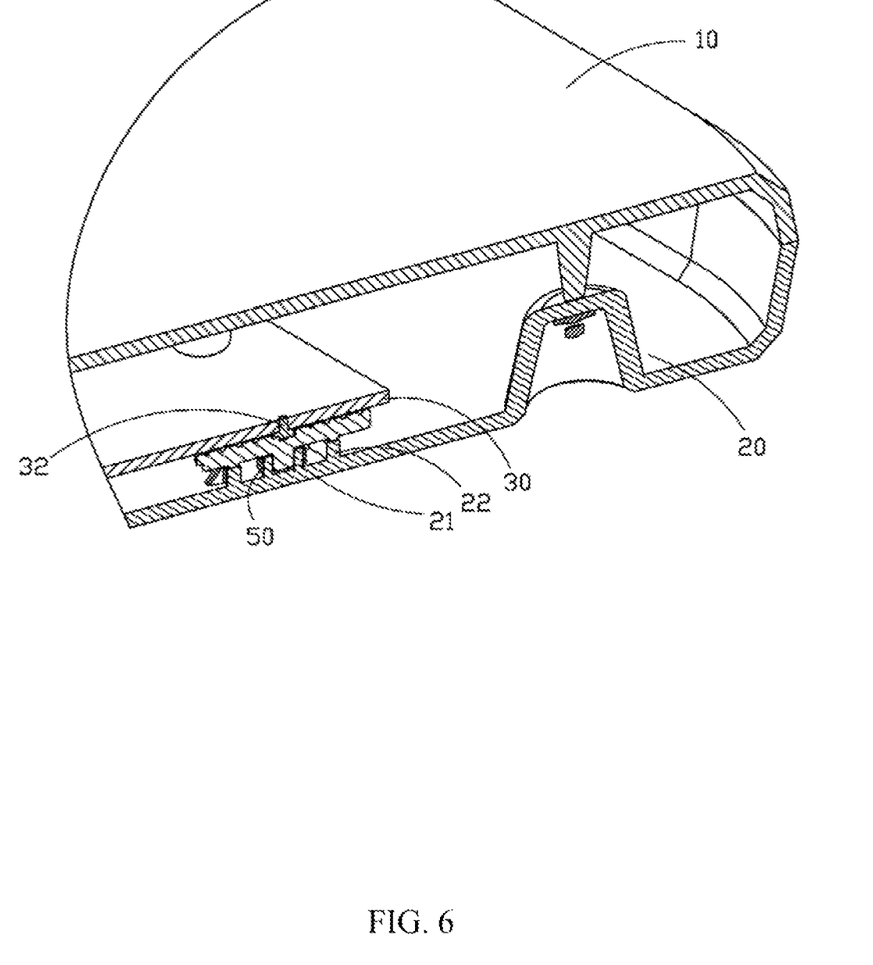
FIG. 6 is a partial cross-sectional view of the electronic device with anti-theft structure.

FIG. 6 illustrates that, in assembly, the shaft 42 of the connector 40 is inserted into the axle hole 211, and the two projecting portions 4122 respectively contact second surfaces of the supporting portions 22. The elastic element 50 is located between the main body 41 and the second cover 20. The first end 51 of the elastic element 50 is inserted into the recess 4121, and the second end 52 of the elastic element 50 resists one of the supporting portions 22. The terminals 60 are set in partial slots 413, which is in a predetermined positional relationship. When the first cover 10 is closed against the second cover 20, the first press piece 32 resists against second press piece 414 and the first matching surface 3221 engages with the second matching surface 41411, to rotate the main body 41 around the shaft 42. The elastic element 50 stores elastic force when the main body 41 is rotated. When the first cover 10 is latched with the second cover 20, the first press piece 32 engages with the second press piece 414 to contain the elastic force, and the terminals 60 on the main body 41 are electrically coupled to the pads 31 of the PCB 30. The PCB 30 produces first control signals to make the electronic device 100 work.

When an unauthorized person disassembles the first cover 10 from the second cover 20, the PCB 30 is detached from the main body 41, and the first press piece 32 is separated from the second press piece 414. The main body 41 rotates to original position under the elastic force until the main body 41 is stopped by the stopper 221. The terminals 60 fall from the slots 413. An unauthorized person does not know the predetermined positional relationship between each of the terminals 60 and each slot 413. If the positional relationship between the terminals 60 and the slots 413 is changed, the PCB produces second control signals. Since the unauthorized person does not know the original positions of the terminals 60, it is highly probable that the second control signals are different from the first control signals. A processor (not shown) in the PCB 30 compares the second control signals with the first control signals. When the second control signals are different from the first control signals, the processor locks down the electronic device 100 and prevents it from working, which avoids the resetting of the electronic device 10.

The number of terminals 60 and slots 413 can be increased to increase the probability of creating differences between the first and the second control signals.

The projecting portions 4122 of the second surface 412 can reduce a frictional force made by a rotation of the main body 41 with respect to the supporting portions 22. The main body 41 is rotated to original position via the elastic element 50 and the stopper 221, which makes the terminals 60 fall from the slots 413. Thus, the unauthorized person does not know the original positions of the terminals 60.

The exemplary embodiments shown and described above are only examples. Many details are often found in the art such as the other features of an anti-data theft structure and electronic device with the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An anti-disassembly structure, comprising:
   a second cover;
   a printed circuit board (PCB), the PCB comprising a first press piece;
   a connector rotatably coupled to the second cover, the connector defining a plurality of slots facing to the PCB;
   a plurality of terminals received in the plurality of slots in a predetermined position; and
   an elastic element located between the connector and the second cover;
   wherein when the first press piece is resisted with the connector to be rotated with respect to the second cover and the elastic element generates an elastic force, the plurality of terminals are electrically coupled to the PCB to produce a first control signal;
   when the first press piece is separated from the connector, and the connector is rotated under the elastic force to make the plurality of terminals to out from the plurality of slots to cause the PCB to produce a second control signal;
   wherein the second cover comprises a base and two supporting portions surrounding the base, one of the two supporting portions comprises a stopper to stop the connector from rotating by the elastic force;
   wherein the connector comprises a main body and a shaft extending from the main body, the main body comprises a first surface facing to the PCB and a second surface opposite to the first surface, the plurality of slots are defined on the first surface;
   wherein the second surface defines a pair of projecting portions, the base defines an axle hole, when the shaft is inserted into the axle hole, the pair of projecting portions is contacted with the supporting portion;
   wherein the elastic element comprises a first end and a second end opposite to the first end, the first end is coupled to the main body, and the second end is resisted with one of the supporting portion.

2. The anti-disassembly structure of claim 1, wherein the connector comprises a second press piece, the first press piece comprises a first matching surface, the second press piece comprises a second matching surface, when the first press piece is closed to the second press piece, the first matching surface engages with the second matching surface to make the connector to be rotated.

3. The anti-disassembly structure of claim 2, wherein the first matching surface forms a first spiral face in a first direction, and the second matching surface forms a second spiral face in a second direction different from the first direction.

4. The anti-disassembly structure of claim 1, wherein a quantity of the terminals is less than that of the slots.

5. The anti-disassembly structure of claim 4, wherein the terminal is a metal ball and partially received in the slot.

6. An electronic device, comprising:
a first cover; and
an anti-disassembly structure, the anti-disassembly structure comprising:
a second cover;
a printed circuit board (PCB), the PCB comprising a first press piece;
a connector rotatably coupled to the second cover, the connector defining a plurality of slots facing to PCB;
a plurality of terminals received in the plurality of slots in a predetermined position; and
an elastic element located between the connector and the second cover;
wherein when the first cover is latched with the second cover, the first press piece is resisted with the connector to be rotated with respect to the second cover and the elastic element generates an elastic force, and the plurality of terminals are electrically coupled to the PCB to produce a first control signal to make the electronic device to work;
when the first press is separated from the connector, and the connector is rotated under the elastic force to make the plurality of terminals to out from the plurality of slots cause the PCB to produce a second control signal;
wherein the first cover comprises a base and two supporting portions surrounding the base, one of the two supporting portions comprises a stopper to stop the connector from rotating by the elastic force;
wherein the connector comprises a main body and a shaft extending from the main body, the main body comprises a first surface facing to the PCB and a second surface opposite to the first surface, the plurality of slots are defined on the first surface;
wherein the second surface defines a pair of projecting portions, the base defines an axle hole, when the shaft is inserted into the axle hole, the pair of projecting portions is contacted with the supporting portion;
wherein the elastic element comprises a first end and a second end opposite to the first end, the first end is coupled to the main body, and the second end is resisted with one of the supporting portion.

7. The electronic device of claim 6, wherein when the positional relationship between the terminals and the slot is changed, which is different from the predetermined position, the PCB produces the second control signal to forbid the electronic device working.

8. The electronic device of claim 6, wherein the connector comprises a second press piece, the first press piece comprises a first matching surface, the second press piece comprises a second matching surface, when the first press piece is closed to the second press piece, the first matching surface engages with the second matching surface to make the connector to be rotated.

9. The electronic device of claim 8, wherein the first matching surface forms a first spiral face in a first direction, the second matching surface forms a second spiral face in a second direction different from the first direction.

10. The electronic device of claim 6, wherein quantity of the terminals is less than that of the slots.

11. The electronic device of claim 10, wherein the terminal is a metal ball and partially received in the slot.

12. The electronic device of claim 6, wherein the PCB is mounted on the second cover by screws.

\* \* \* \* \*